May 19, 1942.  E. ACHTERMAN  2,283,863
ROCKET ENGINE
Filed Sept. 29, 1937  4 Sheets-Sheet 2
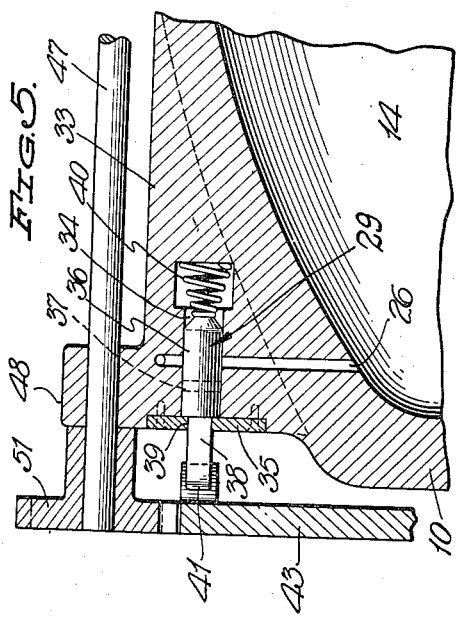
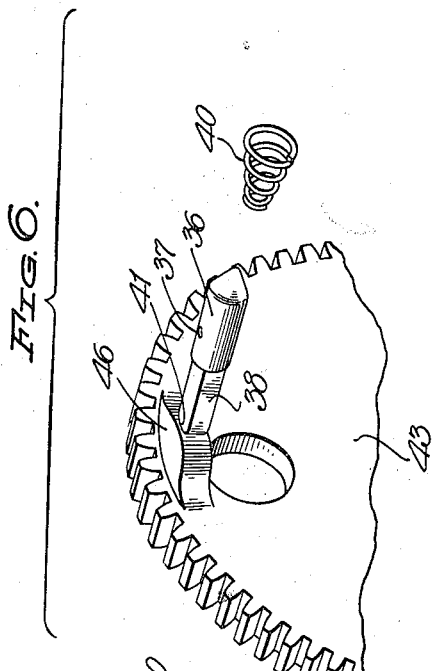
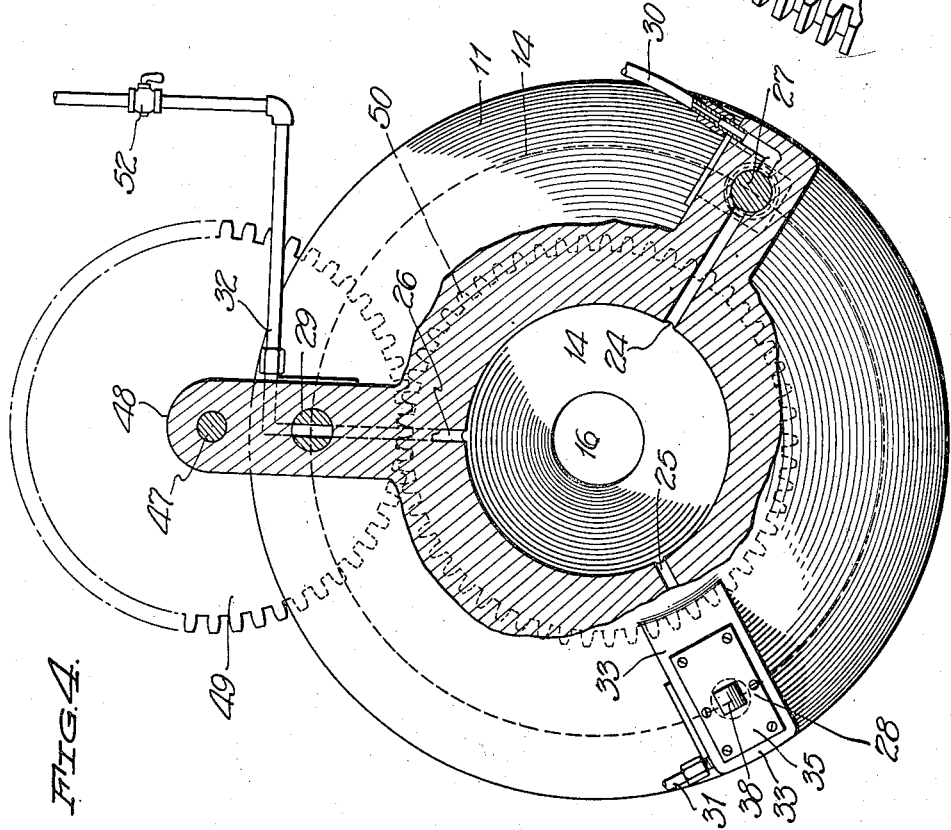
ERNEST ACHTERMAN.
INVENTOR.
BY Ely & Pattison.
ATTORNEYS.

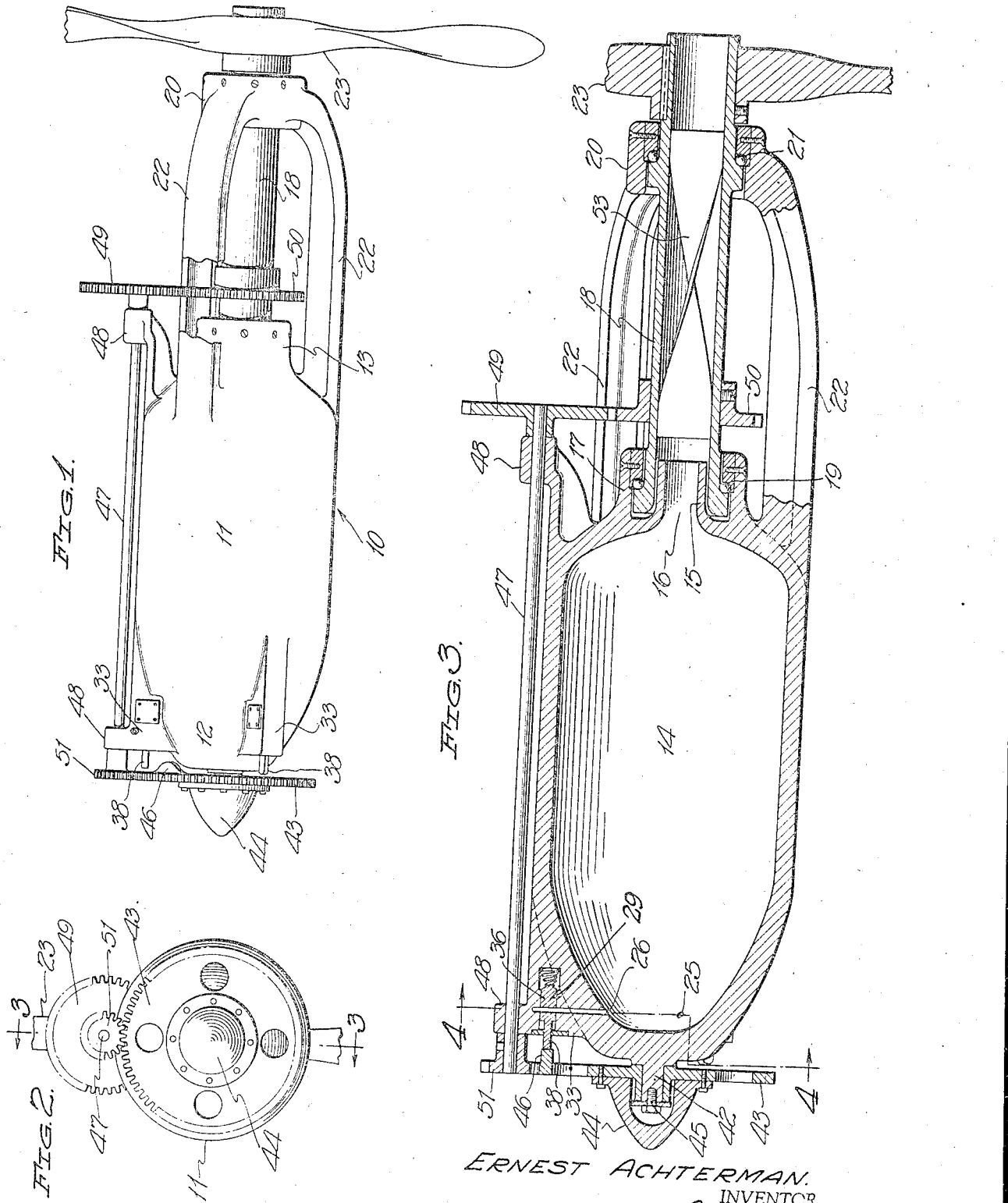

May 19, 1942.  E. ACHTERMAN  2,283,863
ROCKET ENGINE
Filed Sept. 29, 1937   4 Sheets-Sheet 3
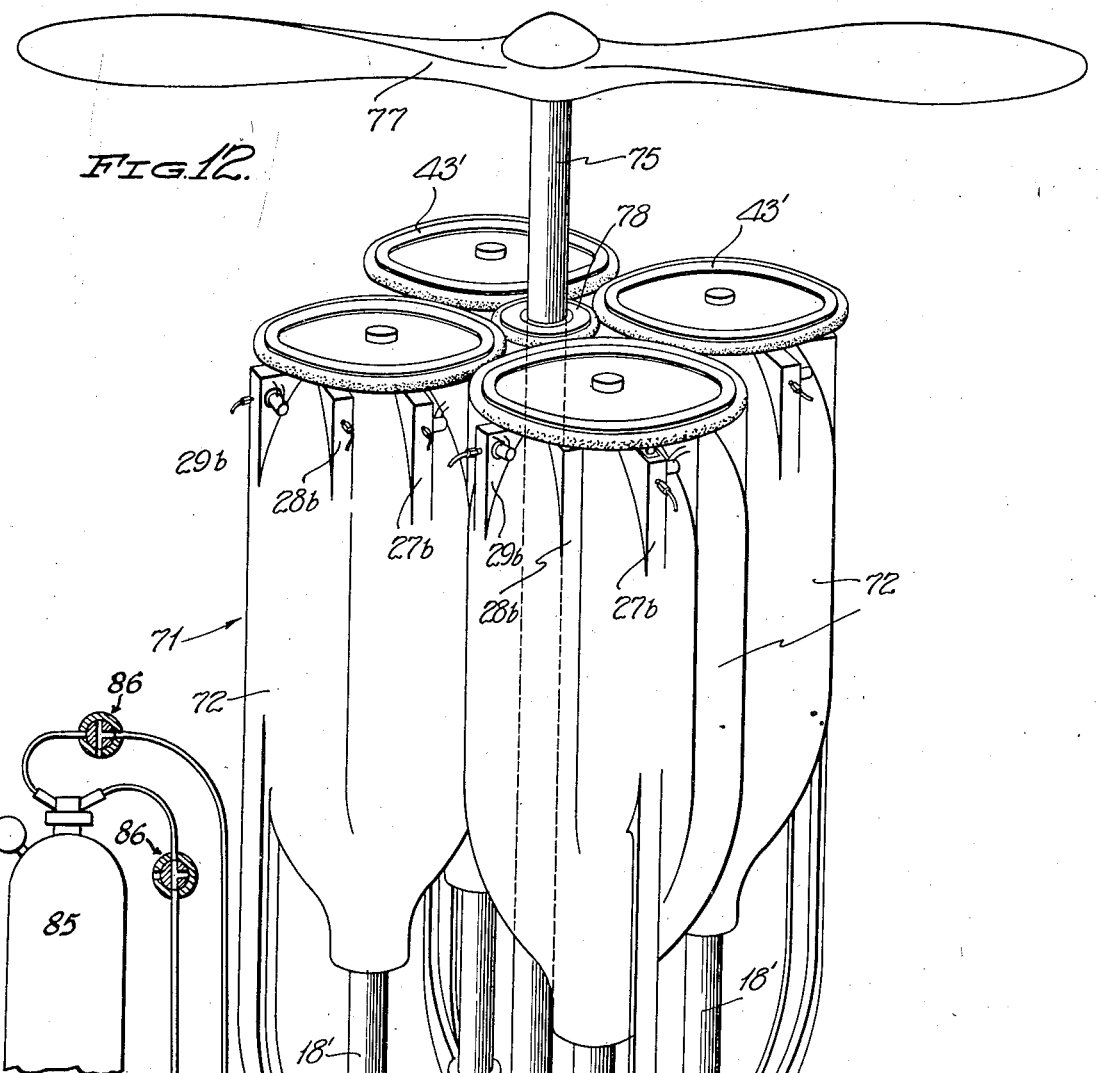
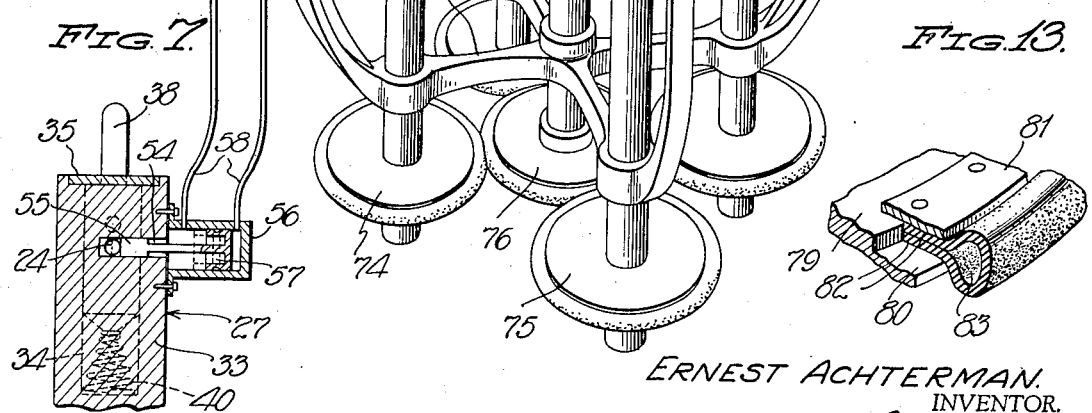
ERNEST ACHTERMAN.
INVENTOR.
BY Ely & Pattison,
ATTORNEYS.

May 19, 1942.  E. ACHTERMAN  2,283,863
ROCKET ENGINE
Filed Sept. 29, 1937  4 Sheets-Sheet 4
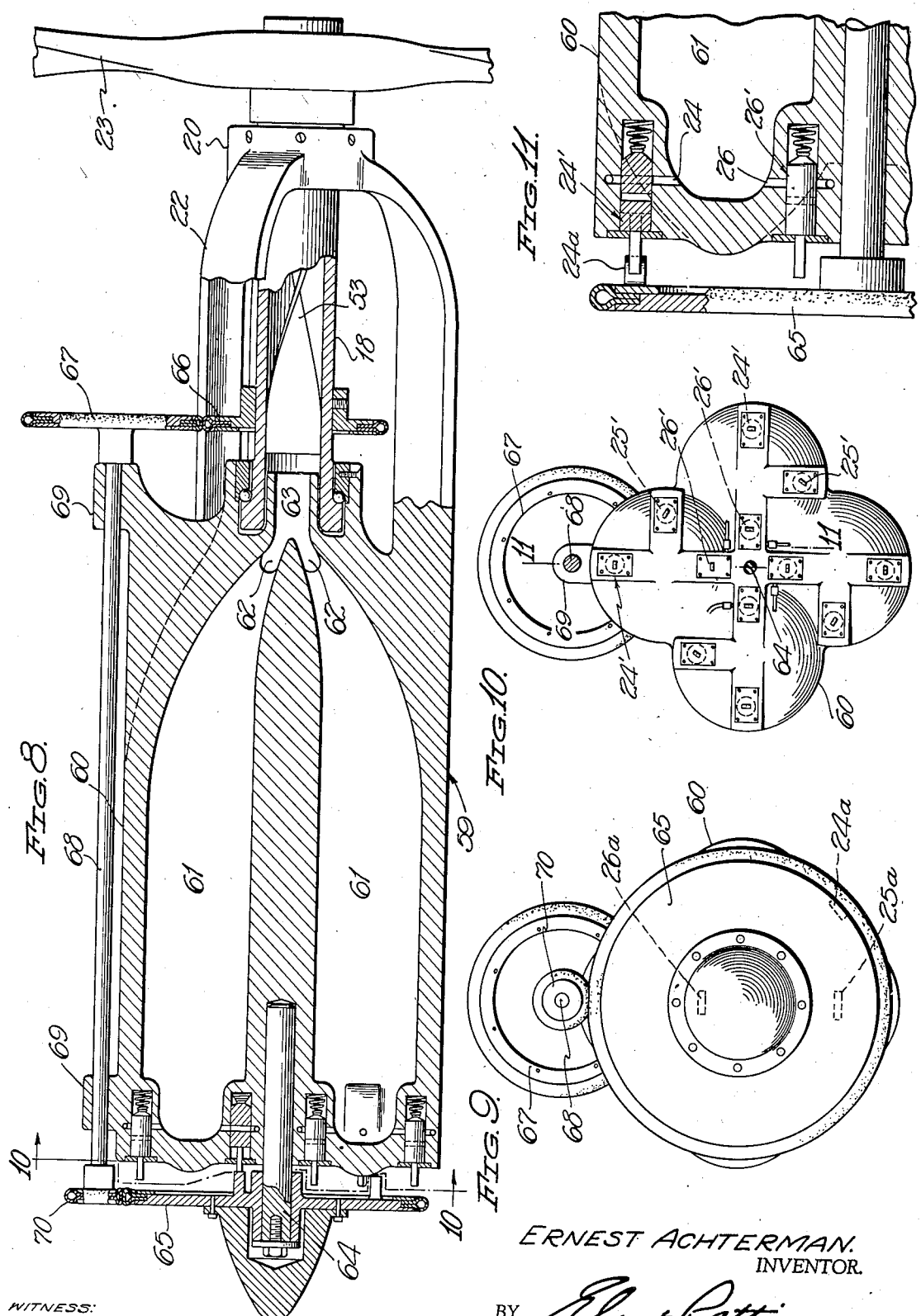
ERNEST ACHTERMAN.
INVENTOR.
BY Ely & Pattison.
ATTORNEYS.

Patented May 19, 1942

2,283,863

UNITED STATES PATENT OFFICE 2,283,863

ROCKET ENGINE

Ernest Achterman, Westfield, N. J., assignor to Ernest Frank Achterman, Westfield, N. J.

Application September 29, 1937, Serial No. 166,290

4 Claims. (Cl. 60—35.6)

This invention relates to internal combustion engines and more particularly to a rocket type engine.

One of the features of the invention resides in an internal combustion engine especially adapted for use upon airplanes flying in the light air of the stratosphere, although it will be found efficient for marine and other uses.

Another feature of the invention is to provide an internal combustion engine for airplanes which makes use of the combined explosive force, the force of the exhaust gases, as well as the rotary force of a propeller driven thereby, to produce a single forward propelling force, and which harnessing of these forces effects a saving in fuel which otherwise would be required to obtain a like force of propelling power.

Another feature of the invention is the provision of an internal combustion engine which receives a predetermined charge of water within the combustion chamber with each charge of combustible fuel to prevent excessive heating of the engine, the said water to be transformed into steam by reason of the intense heat of the combustion chamber, and the expansion force of the confined steam cooperates with the other combined propelling forces to increase the power thereof.

A further feature of the invention is the provision of an internal combustion engine which makes use of a proportionate mixture of liquid oxygen and gasoline individually and alternately introduced into a combustion chamber for explosion therein.

A still further feature of the invention is the provision of an internal combustion engine having a relatively few working parts by reason of the elimination of the usual electrical ignition system, reciprocating pistons, carburetor and like parts so vital to the operation of the usual combustion engine.

A still further feature is to provide in an engine of the kind heretofore mentioned, a novel control mechanism for predeterminedly controlling the sequential introduction of the liquid explosive components to the combustion chamber.

With these and other objects in view, the invention further resides in the novel details of construction, combination and arrangement of parts, the essential features of which are hereinafter fully described in the following specification, and particularly pointed out in the appended claims, and illustrated in the accompanying drawings, in which:

Figure 1 is a side elevational view of a single combustion chamber type engine constructed in accordance with my invention.

Figure 2 is a front elevational view.

Figure 3 is an enlarged vertical longitudinal sectional view on the line 3—3 of Figure 2.

Figure 4 is a fragmentary vertical transverse sectional view on the line 4—4 of Figure 3.

Figure 5 is an enlarged detail vertical transverse sectional view through one of the control valves.

Figure 6 is a fragmentary detail perspective view of the valve actuating cam and its relative operating position with one of the valve members.

Figure 7 is a detail horizontal sectional view illustrating the use of an auxiliary regulating device associated with the gasoline control valve.

Figure 8 is a vertical longitudinal sectional view with part in side elevation of a multi-cylinder rocket engine.

Figure 9 is a front elevational view of the engine shown in Figure 8.

Figure 10 is a vertical transverse sectional view on the line 10—10 of Figure 8.

Figure 11 is an enlarged detail vertical sectional view on the line 11—11 of Figure 10.

Figure 12 is a perspective view of a multiple unit engine for use upon aircraft of the helicopter type.

Figure 13 is a detail sectional perspective view of the friction drive wheel.

Referring to the drawings by reference characters and at present to the form of my invention shown in Figures 1 to 6 of the drawings, the numeral 10 designates my rocket type engine in its entirety. The engine 10 includes a substantially bullet shaped cylindrical casing 11 having a forwardly tapering head end 12 and a reduced tail end 13. The engine 10 is adapted to be rigidly supported in a horizontal position but it is not believed necessary to illustrate and describe any particular support or anchorage, for any conventional structure may be resorted to.

The interior of the casing 11 constitutes a combustion chamber 14 and provided at the tail end of the casing centrally of the longitudinal axis thereof is a restricted exhaust nipple 15 defining an exhaust outlet 16 at the rear end of the combustion chamber 14. Formed integral with the tail end of the casing and disposed in concentric spaced relation with respect to the nipple 15 is a bearing collar 17. The front end of an exhaust tube 18 freely telescopes the nipple 15 and is rotatably supported by the bearing collar 17 with anti-friction ball bearing means 19 therebetween. The rear end of the exhaust tube 18 is rotatably supported by a bearing collar 20 having anti-friction ball bearing means 21 therebetween. The bearing collar 20 is integral with rearwardly extending arms 22, the latter being integral with the rear end of the casing 10. The extreme rear end of the exhaust tube 18 has an airplane propeller 23 of the pusher type fixed thereto.

Fixed within and extending longitudinally within the exhaust tube 18 is a spiral fin or longitudinal partition wall 53 which is acted upon by the force of combustion and exhaust gases in the escape of the latter from the combustion chamber 14.

Opening radially into the front end of the combustion chamber 14 through the walls of the casing 11 is a gasoline fuel inlet orifice 24, a liquid oxygen inlet orifice 25, and a water inlet orifice 26. The flow of liquids through the orifices 24, 25 and 26 is controlled by valves 27, 28, and 29 respectively. Pipes 30, 31, and 32 lead from one side of the valves 27, 28, and 29 respectively, to sources of supply of gasoline, liquid oxygen, and water, the feed from the sources of supply being under pressure or by gravitational flow.

The valves 27, 28, and 29 are of identical construction and a description of one will suffice for the others. Each control valve includes a radially disposed boss 33 formed integral with the head end 12 of the casing 11 and extending inwardly from the front side of the boss is a recess 34 closed by an outer countersunk plate 35. The longitudinal axis of the recess is at right angle to the inlet orifice with which it is associated and slidably disposed therein is a cylindrical valve member 36 having a transversely disposed passage 37 therein. Formed integral with the front end of the valve member 36 is a stem 38 which is square in cross section and which slidably extends through a square opening 39 in the plate 35. An expansion spring 40 has one of its ends disposed against the inner end wall of the recess 34 and acts to normally urge the valve member forwardly to position the passage 37 forwardly of and out of registration with the inlet orifice. Outward movement of the valve member 36 is limited by engagement of the front end of the same with the plate 35. The stem 38 projects forwardly a sufficient distance to dispose the rounded outer end 41 thereof in the path of rotation of an actuating cam presently to be described. The rounded ends 41 of the stems 38 of all the valves 27, 28, and 29 are disposed on the same circumferential plane to be successively engaged by the actuating cam.

Extending forwardly from the front head end 12 of the casing and in axial alinement with the axis of the casing is a rigid stub shaft 42 and rotatably mounted thereon is a cam carrier gear 43. The front side of the carrier gear 43 carries a nose cap 44 which conceals the end of the stub shaft 42 and the fastening means 45 by which the gear is rotatably held on said shaft. The rear side of the carrier gear 43 is provided with a cam 46 disposed on a circumferential plane to successively engage the rounded ends 41 of the valve stems 38 during rotation of the gear for moving the valve members 36 inwardly against the action of the springs 40 to cause a momentary registration of the passages 37 with the respective inlet orifices.

Extending parallel to the axis of the casing 11 and exteriorly thereof is a shaft 47 mounted in spaced bearings 48—48 integral with and disposed fore and aft of said casing. Whereas I have shown the shaft 47 as being disposed at the top of the casing, it may be located at the bottom or any other radial position with respect to the axis of the casing. Fixed to the rear end of the shaft 47 is a gear 49 meshing with a drive gear 50 which is fixedly mounted on the rotatable exhaust tube 18. The front end of the shaft 47 carries a pinion gear 51 which has constant mesh with the cam carrier gear 43, thus rotation may be transmitted from the driven rotatable exhaust tube 18, through the medium of the meshing gears 50 and 49, shaft 47, gear 51, to the gear 43. Whereas, I have shown certain gear ratios for the transmission of power from the driven rotatable exhaust tube to the gear 43 which carries the valve actuating cam 46, I do not wish to limit myself thereto for the drawings are merely illustrative of the principles involved in the invention.

The water supply pipe 32 is provided with a hand operated valve 52 along the length thereof within reach of an operator of the engine, for it is not intended that water be introduced into the combustion chamber until after the engine has become sufficiently heated as to transform the injected water into steam immediately upon its entry into the combustion chamber 14.

Assume that the supply of water through the water supply pipe 32 is shut off by closing the valve 52 and it is desired to start the engine. Initial rotation is imparted to the rotatable exhaust tube 18 by means of an engine starting mechanism (not shown) or by manually grasping the propeller 23 and imparting rotation thereto. As the exhaust tube 18 is initially turned, rotation is imparted to the gear 43 carrying the valve actuating cam 46 through the medium of the meshing gears 50 and 49, shaft 47, and meshing gears 51 and 43. As the cam 46 successively engages the valve stems 38 of the valves 27 and 28, predetermined quantities of liquid gasoline and liquid oxygen are admitted to the combustion chamber 14 through the respective orifices 24 and 25 respectively. It is to be understood that prior to the feeding of the liquid fuel to the combustion chamber, that the same is pre-heated to ignition temperature. The presence of these confined liquids in the combustion chamber 14 produces an explosive reaction by reason of the liquid oxygen entering the heated combustion chamber and combining with the gasoline, the force of the explosion reacts upon the closed front head end of the casing to exert a forward propelling impulse thereto, while the rearward force of the explosion acts upon the screw or spiral blade 53 together with the force of the exhaust gases of combustion during their escape from the combustion chamber through the exhaust tube 18 to impart rotational power to the rotatable exhaust tube 18. When the engine is operating after initial starting of the same, the propeller 23 being carried by the driven rotatable exhaust tube also acts to exert a forward propelling force to the engine 10 and to any movable device such as an airplane on which the engine is mounted. When the combustion chamber becomes sufficiently heated by the explosion of the liquid oxygen and gasoline, the operator may turn on the valve 52 and on each revolution of the cam 46, the said cam will momentarily actuate the water control valve 29 and admit a predetermined amount of water to the combustion chamber 14 to cool the same. Due to the intense heat within the combustion chamber, the intermittent introduction of water thereto will cause the water to be transformed into steam and the accumulation and expansive action thereof will also act upon the walls of the spiral partition 53 and exert a rotative force thereto.

From the foregoing description it will be understood that use is made of the explosive forces, forces of the exhaust gases of combustion in their escape from the combustion chamber, and forces of steam expansion for rotating the exhaust tube 18, and with the propeller 23 mounted on the exhaust tube, there is a concentration of the forces in a forward propelling direction, thus producing an engine highly efficient for propelling airplanes, flying boats, and other like forwardly propelled craft.

In Figure 7 of the drawings, I have illustrated an auxiliary gasoline control valve associated with the gasoline supply valve 27. Formed in the boss 33 and disposed at right angle to and in communication with the inlet orifice 24 is a recess 54 in which a slide valve member 55 is mounted. The slide valve member 55 is movable to a position to fully or partially shut off the flow of gasoline through the orifice 24 and the actuating means therefor includes a cylinder 56 having a reciprocatory piston 57 therein and which is connected to the valve member 55. Compressed air tubes 58—58 enter the cylinder at opposite sides of the piston 57 and by manually controlling the differential of air pressure upon opposite sides of the piston, the relative position of the slide valve member 55 may be changed with respect to the orifice 24 to regulate the flow of liquid fuel therethrough. The tubes 58—58 may be connected to a compressed air tank 85 and three-way control valves 86—86 are arranged in the length of the tubes to admit and bleed air from opposite sides of the piston.

In Figures 8 to 11 inclusive I have illustrated a modified form of my invention wherein the same principle is embodied in a multi-combustion chamber engine 59 comprising a casing 60 having four combustion chambers 61 arranged in radial arrangement about a common axis, the chambers 61 being in opposed pairs. The chambers 61 have rear restricted exhaust outlets 62 which open into a common exhaust nipple 63. The rear construction and assembly beyond the nipple 63 is the same as that illustrated in Figures 1 to 6 of the drawings and like reference characters refer to similar parts, thus the rotatable exhaust tube 18 receives the exhaust gases from a plurality of combustion chambers 61 instead of a single chamber as shown in Figures 1 to 6 inclusive.

The means for introducing gasoline, liquid oxygen and water to the respective combustion chambers 61 is similar to that heretofore described with the exception that the gasoline control valves 24', liquid oxygen control valves 25', and water control valves 26' are arranged on different circumferential planes with respect to the central longitudinal axis of the casing 60. The valves 24', 25' and 26' for each combustion chamber are on the same circumferential plane with respect to the longitudinal axis of the combustion chamber as best seen in Figure 10.

Extending forwardly from the front head end of the casing 60 in alinement with the longitudinal axis thereof is a stub shaft 64 on which a driven friction wheel 65 is rotatably mounted. The rear face of the friction wheel 65 is provided with three cams 24a, 25a, and 26a, which are respectively disposed on the same circumferential planes as the valve stems of the respective valves 24', 25', and 26', so as to successively open the valves to admit the predetermined quantities of gasoline, liquid oxygen, and water into the respective combustion chambers 61. The valves 24', 25', and 26' are identical with the construction of the valves 24, 25, and 26, and a specific explanation of the same is not deemed necessary.

In view of the use of a friction drive cam carrier wheel 65, I employ throughout this form of my invention a friction drive from the driven rotatable exhaust tube 18. The tube 18 in this instance has a friction drive wheel 66 fixed thereon which engages the periphery of a wheel 67 fixed to the rear end of a shaft 68 extending fore and aft of the casing 60 and journaled in bearings 69. The front end of the shaft 68 carries a friction wheel 70 in driving engagement with the periphery of the wheel 65. In this form of the invention I employ a friction drive transmission from the rotatable exhaust tube 18 to the cam carrier wheel instead of by the use of meshing gears as shown and described in the preceding form.

In Figure 12 of the drawings, I have illustrated a further modification of my invention wherein multiple engine units are employed for transmitting their entire propelling forces to a single driven propeller shaft, the head ends of the engine units facing upwardly and the tail ends downwardly. The multiple engine 71 is designed for use upon airplanes of the helicopter type, for all forces produced by the operation of the engine are upward.

The multiple engine 71 includes four engine units 72 arranged in radial arrangement with their head ends up and their tail ends down. The units 72 are substantially identical to the engine 10 and it is therefore believed only necessary to describe the different features which are present therein.

The rotatable exhaust tubes 18' have their lower ends journaled in the arms of a cross shaped bearing member 73 and have friction wheels 74 fixed thereto. Also journaled in the bearing member 73 and disposed centrally of the group of engine units is a propeller shaft 75 and the peripheries of the friction wheels 74 engage the periphery of a friction wheel 76 fixed to the propeller shaft 75. The upper portion of the propeller shaft may also be mounted in bearings and the top end of the same carries a lifting propeller 77.

The top ends of the casings of the engine units 72 have friction cam carrying wheels 43' which are identical in function to the gears 43 heretofore described for successively operating the gasoline, liquid oxygen, and water control valves 27b, 28b, and 29b, which are the same as the valves 27, 28, and 29. The friction wheels 43' have frictional engagement with the periphery of the friction wheel 78 fixed to the propeller shaft 75.

In the arrangement shown in Figure 12, it will be seen that the propelling forces set up by the engine are directed upwardly and that power is transmitted to the propeller shaft 75 from the plurality of individually driven rotatable exhaust tubes 18'. Also, the cam carrier wheels 43' which control the operation of the liquid control valves receive their rotative power from the common friction wheel 78.

In the form of the invention shown in Figures 8 to 12 inclusive, I have resorted to the use of friction drive wheels instead of gears and in Figure 13 I have illustrated in detail the construction of the periphery or tread of such type of friction wheel. Each friction wheel includes a disk body 79 which is provided with an integral reduced peripheral flange 80. Bolted or otherwise secured to the body 79 and arranged in opposed relation with respect to the flange 80 is a flat ring 81. Clamped between the ring 81 and flange 80 are the free edge portions 82 of a folded friction shoe 83, the looped folded portion of the shoe projecting beyond the periphery of the flange 80 and ring 81 and constituting the friction thread portion. The friction shoe 83 is similar in design and construction to an automobile shoe and may be constructed of rubber, or rubber and fabric. During rotation of the wheel body 79, the centrifugal force will act to distend the shoe 83 outwardly into positive frictional driving engagement with the tread of a similar shoe of a friction wheel similarly constructed.

Whereas I have specifically mentioned the use of gasoline as a fuel for my engine, I wish it to be understood that other more powerful oils may be used in lieu thereof if found economically feasible. An engine operating independently of air will be found practical for use on airplanes traveling in the thin air of the stratosphere as well as under water. Furthermore, while all engine units herein shown and described are primarily designed for airplane use, the same may also be used as a marine engine.

While I have shown and described what I consider to be the preferred embodiments of my invention, it will be understood that such changes and alterations as come within the scope of the appended claims may be resorted to if desired.

Having thus described the invention, what I claim as new and desire to secure by Letters Patent of the United States, is:

1. An engine comprising in combination, an elongated casing having a head end and a tail end, a combustion chamber within said casing, an exhaust outlet in the tail end of the casing axially thereof and in open communication with said combustion chamber, a combustible liquid fuel inlet and a liquid oxygen inlet in the head end of the casing opening into said combustion chamber, a slide valve for said liquid fuel inlet for controlling the flow of liquid fuel into said combustion chamber, a slide valve for said liquid oxygen inlet, each of said slide valves including a reciprocable valve stem, a spring acting to hold each slide valve in closed position, the valve stems being disposed within the same circumferential plane with respect to the longitudinal axis of said casing, a cam carrier wheel rotatably mounted at the head end of said casing axially thereof, a cam provided on the rear face of said carrier wheel and successively engageable with the valve stems of said slide valves to actuate the same to open position against the action of the springs during rotation of said carrier wheel to admit liquid fuel and oxygen into said combustion chamber, and means driven by the resultant forces produced by the explosion of the liquid fuel and liquid oxygen within said combustion chamber for imparting rotation to said carrier wheel during operation of the engine, said means including an exhaust tube of uniform diameter having its inner end rotatably connected to the exhaust outlet, and a spiral partition fixed within the exhaust tube and extending lengthwise thereof.

2. An engine comprising in combination, an elongated casing having a head end and a tail end, a plurality of combustion chambers within said casing and arranged radially around the axis thereof, each chamber having a restricted gas outlet at the tail end thereof, an exhaust outlet at the tail end of the casing axially thereof connected to the restricted gas outlets of said combustion chambers, a rotatable exhaust tube journalled at the tail end of the casing axially thereof and having its inner end connected to said exhaust outlet, an elongated spiral partition fixed within said exhaust tube and disposed lengthwise thereof, fuel inlets at the head end of said casing for admitting fuel to the respective chambers, valve means at the head end of said casing for intermittently controlling the passage of fuel through said fuel inlets, and valve actuating means operatively connected to and driven by said exhaust tube for intermittently controlling the actuation of said valve means when said exhaust tube is rotated by the direct forces of combustion within said combustion chamber combined with the forces of the expanded exhaust gases of combustion acting upon said spiral partition.

3. In an engine, an elongated casing having a head end and a tail end, a plurality of combustion chambers arranged within and disposed about the longitudinal axis of said casing, each combustion chamber having an oxygen inlet and a liquid combustible fuel inlet radially arranged at the head end of said casing for admitting explosive components into a combustion chamber, control valves for the respective oxygen and fuel inlets of each combustion chamber, each of said control valves having a valve stem, the valve stems of the control valves of the oxygen inlets and those of the fuel inlets being disposed on different circumferential planes with respect to the longitudinal axis of said casing, a stub shaft mounted in the head end of the casing having its axis concentric to the longitudinal axis of said casing, a driven disk rotatable on said stub shaft, cams on the inner face of said disk equal in number to the number of control valves associated with each chamber and being disposed in the same respective circumferential planes as the valve stems for engagement therewith during rotation of said disk, a common exhaust outlet axially of the casing at the tail end thereof having communication with all of the chambers, a rotatable cylinder having one end connected to said outlet, a spiral partition fixed within said cylinder against which the forces of combustion and the expanding gases therefrom act to impart rotation to said cylinder, and a rotating drive connection between said cylinder and said driven disk for imparting rotation thereto.

4. In an engine, an elongated casing having a head end and a tail end, an elongated combustion chamber within said casing extending from the head end to the tail end thereof, fuel inlets provided at the head end of said chamber, a gas exhaust outlet at the tail end of the casing axially thereof, a restricted outlet passage connecting the chamber with said gas exhaust outlet, a bearing surrounding the exhaust outlet, a rotatable tube of uniform diameter having its inner end mounted in said bearing to connect the same to the exhaust outlet, a bearing arm connected to the tail end of said casing extending therebeyond, a bearing carried by the outer end of the arm in axial alinement with the first named bearing, the outer end of said tube being rotatably mounted in said second mentioned bearing, a twisted blade member within said tube and extending lengthwise thereof to provide a spiral passage within the tube, whereby explosive forces from the combustion chamber combined with the expanded exhaust gases therefrom forcibly act upon the spiral blade member to impart driving rotation to the tube, and power take-off means connected to said tube.

ERNEST ACHTERMAN.